(12) United States Patent
Wen et al.

(10) Patent No.: US 7,616,184 B2
(45) Date of Patent: Nov. 10, 2009

(54) ARRANGEMENT MATRIX OF PRIMARY COLOR LEDS

(75) Inventors: Chung-Han Wen, Tu Chen (TW); Pang-Yen Liu, Tucheng (TW)

(73) Assignee: Everlight Electronics Co., Ltd., Taipei Hsien (TW)

( * ) Notice: Subject to any disclaimer, the term of this patent is extended or adjusted under 35 U.S.C. 154(b) by 555 days.

(21) Appl. No.: 11/525,846

(22) Filed: Sep. 25, 2006

(65) Prior Publication Data

US 2008/0001908 A1    Jan. 3, 2008

(30) Foreign Application Priority Data

Jun. 28, 2006    (TW) ............................. 95123417 A

(51) Int. Cl.
 *G09G 3/36* (2006.01)
(52) U.S. Cl. ..................... 345/102; 345/82; 250/553
(58) Field of Classification Search ............... 345/82, 345/83, 102; 250/553; 362/230, 231
See application file for complete search history.

(56) References Cited

U.S. PATENT DOCUMENTS

| 6,200,002 B1 * | 3/2001 | Marshall et al. ............. 362/231 |
| 6,600,470 B1 * | 7/2003 | Tsuda ......................... 345/89 |
| 6,608,614 B1 * | 8/2003 | Johnson ..................... 345/102 |
| 7,495,723 B2 * | 2/2009 | Chung et al. ................ 349/108 |
| 2007/0236154 A1 * | 10/2007 | Lee ........................... 315/246 |

FOREIGN PATENT DOCUMENTS

| EP | 1143288 | 10/2001 |
| EP | 1640792 | 3/2006 |
| JP | 11-003051 | 1/1999 |
| JP | 2006-278368 | 10/2006 |
| JP | 2006-331839 | 12/2006 |
| WO | WO02/079862 | 10/2002 |
| WO | WO2007/149362 | 12/2007 |

* cited by examiner

*Primary Examiner*—Richard Hjerpe
*Assistant Examiner*—Tom V Sheng
(74) *Attorney, Agent, or Firm*—Rosenberg, Klein & Lee

(57) ABSTRACT

An arrangement matrix of primary color LEDs is provided. The arrangement matrix includes a first LED, a second LED and a third LED. The first LED, the second LED and the third LED are arranged to form a 4×4 lowest matrix unit. The ratio of the numbers of the first LEDs, the second LEDs and the third LEDs is 2:1:1. The first LED, the second LED and the third LED are presented as $\alpha, \beta,$ and $\gamma$. The arrangement of the lowest repeat matrix unit is shown below:

$$\begin{bmatrix} \alpha & \beta & \alpha & \gamma \\ \gamma & \alpha & \beta & \alpha \\ \alpha & \gamma & \alpha & \beta \\ \beta & \alpha & \gamma & \alpha \end{bmatrix}.$$

6 Claims, 3 Drawing Sheets

$$\begin{bmatrix} \alpha & \beta & \alpha & \gamma \\ \gamma & \alpha & \beta & \alpha \\ \alpha & \gamma & \alpha & \beta \\ \beta & \alpha & \gamma & \alpha \end{bmatrix}$$

$$\begin{bmatrix} R & G \\ G & B \end{bmatrix}$$

Fig. 1

(PRIOR ART)

$$\begin{bmatrix} \alpha & & \alpha & \\ & \alpha & & \alpha \\ \alpha & & \alpha & \\ & \alpha & & \alpha \end{bmatrix}$$

Fig. 2

$$\begin{bmatrix} & \alpha & & \alpha \\ \alpha & & \alpha & \\ & \alpha & & \alpha \\ \alpha & & \alpha & \end{bmatrix}$$

Fig. 3

$$\begin{bmatrix} \alpha & \beta & \alpha & \gamma \\ \gamma & \alpha & \beta & \alpha \\ \alpha & \gamma & \alpha & \beta \\ \beta & \alpha & \gamma & \alpha \end{bmatrix}$$

Fig. 4

$$\begin{bmatrix} \alpha & \gamma & \alpha & \beta \\ \beta & \alpha & \gamma & \alpha \\ \alpha & \beta & \alpha & \gamma \\ \gamma & \alpha & \beta & \alpha \end{bmatrix}$$

Fig. 5

$$\begin{bmatrix} \beta & \alpha & \gamma & \alpha \\ \alpha & \gamma & \alpha & \beta \\ \gamma & \alpha & \beta & \alpha \\ \alpha & \beta & \alpha & \gamma \end{bmatrix}$$

Fig. 6

$$\begin{bmatrix} \gamma & \alpha & \beta & \alpha \\ \alpha & \beta & \alpha & \gamma \\ \beta & \alpha & \gamma & \alpha \\ \alpha & \gamma & \alpha & \beta \end{bmatrix}$$

Fig. 7 and most important issues to effectively mix the RGB arrangement to generate the white light, and to efficiently generate the uniform white light.

For the forgoing reasons, there is a need for a novel RGB arrangement aligning to overcome the aforementioned drawbacks.

ARRANGEMENT MATRIX OF PRIMARY COLOR LEDS

RELATED APPLICATIONS

The present application is based on, and claims priority from, Taiwan Application Serial Number 95123417, filed Jun. 28, 2006, the disclosure of which is hereby incorporated by reference herein in its entirety.

BACKGROUND

1. Field of Invention

The present invention relates to light emitting diodes (LEDs). More particularly, the present invention relates to an arrangement matrix of primary color LEDs applied in the back light module of the liquid crystal display.

2. Description of Related Art

The backlight module is operated with the light of the backlight source being guided to form a planar light source by a light guiding sheet. Common backlight sources include the cold cathode fluorescent tube, the light emitting diodes (LED), etc. The cold cathode fluorescent tube dominants the market nowadays while the requirement of the LED increases gradually. Comparing with the cold cathode fluorescent tube, the LED has the advantages of the small size, the long life, the low driving voltage, the low power consumption, and the robustness against shock.

Generally speaking, the LED backlight source usually adopts the white LED directly, or the mixed white light generated from the lights of three primary colors: red, green and blue (RGB). Because of the low degree of saturation of the white light emitted by the white LED, most LED backlight modules utilized by the television sets adopt the three primary color lights (RGB) to mix and generate white light in accordance. Please refer to FIG. 1, which illustrates an arrangement matrix of primary color LEDs in the prior art. In FIG. 1, the arrangement matrix is composed of 2×2 matrixes, which is the lowest repeated matrix. As illustrated in FIG. 1, the number of green LEDs is two times of the number of the red LED and the number of the blue LED. Within the lowest matrix unit, one of the green LEDs is located at column 1, row 2, and the other is located at column 2, row 1. The red LED and the blue LED are located at column 1, row 1, and at column 2, row 2, respectively.

The aforementioned RGB arrangement matrix is the lowest repeat unit of the LED backlight source in the prior art. The number of the repeat units to compose the LED backlight source is adjusted according to the size of the required backlight source. Usually, in the backlight module, a plurality of optical diaphragms of different functions, such as a diffuse plate, a focusing sheet, etc., are adopted at a distance of 2-5 cm from the LED backlight source in order to increase the lightness of the backlight module. However, due to the limitation of the mixing distance from the LED backlight source to the optical diaphragm, as being adopted as the LED backlight source, the RGB arrangement matrix in the prior art can generate uniform white light only in the central area, but not in the circumferential area. If the mixing distance is increased further, not only the chromatic polarization is generated around the peripheral of the LED panel, but the volume of the backlight module is increased. If the mixing distance is decreased, not only the horizontal stripe chromatic polarization is generated, but the problem of chromatic polarization deteriorates at the same time. Hence, it becomes one of the

SUMMARY

The present invention is directed to an arrangement matrix of primary color light emitting diodes (LEDs), able to mix the three primary colors to generate not only a uniform white light but totally a uniform white light within a short distance from the backlight source to the optical diaphragm.

It is therefore an aspect of the present invention to provide an arrangement matrix of primary color light emitting diodes (LEDs). The arrangement matrix of primary color LEDs is applied in a backlight source of an LCD. The matrix includes the first LEDs, the second LEDs and the third LEDs. The first LEDs, the second LEDs and the third LEDs are arranged to form a 4×4 matrix unit, with the 4×4 matrix unit being the lowest repeat matrix unit. The ratio of the numbers of the first LEDs, the second LEDs and the third LEDs is 2:1:1. There are two of the first LEDs, not adjacent to each other, located in each row and in each column of each lowest matrix unit respectively. And there are one of the second LEDs and one of the third LEDs located in each row and in each column of each lowest matrix unit respectively.

According to a preferred embodiment of the present invention, the first LEDs, the second LEDs and the third LEDs that are mentioned above emit lights of the three primary colors (red, blue and green) separately. With the first LED, the second LED and the third LED represented by α, β and γ, a preferred arrangement of the lowest matrix unit is as below:

$$\begin{bmatrix} \alpha & \beta & \alpha & \gamma \\ \gamma & \alpha & \beta & \alpha \\ \alpha & \gamma & \alpha & \beta \\ \beta & \alpha & \gamma & \alpha \end{bmatrix}.$$

Further, the locations of the second LEDs β and the locations of the third LEDs γ are interchanged while the locations of the first LEDs α remain the same.

According to another preferred embodiment of the present invention, the locations of the first LEDs α in the matrix can be altered as shown below:

$$\begin{bmatrix} \beta & \alpha & \gamma & \alpha \\ \alpha & \gamma & \alpha & \beta \\ \gamma & \alpha & \beta & \alpha \\ \alpha & \beta & \alpha & \gamma \end{bmatrix}.$$

According to the other preferred embodiment of the present invention, the locations of the second LEDs β and the locations of the third LEDs γ are interchanged while the locations of the first LEDs α remain the same.

Hence by adopting the arrangement matrix of primary color LEDs of the present invention, the backlight source can generate white light uniformly to reduce the chromatic polarization at the peripheral with the distance from the backlight source to the optical diaphragm between 15 mm to 25 mm. Moreover, the present invention may generate totally uniform white light.

These and other features, aspects, and advantages of the present invention will become better understood with reference to the following description, figures, and appended claims.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 is a diagram of an arrangement matrix of primary color LEDs according to the prior art;

FIG. 2-3 are diagrams of an arrangement matrix of the first LEDs according to a preferred embodiment of the present invention; and FIG. 4-7 are diagrams of an arrangement matrix of the primary color LEDs according to a preferred embodiment of the present invention.

DESCRIPTION OF THE PREFERRED EMBODIMENTS

An arrangement matrix of primary color light emitting diodes (LEDs) is herein introduced to solve the problems in the prior art. Reference will now be made in detail to the present preferred embodiments of the invention, examples of which are illustrated in the accompanying drawings. Wherever possible, the same reference numbers are used in the drawings and the description to refer to the same or like parts.

The arrangement matrix of primary colors (RGB) LEDs of the present invention, for generating white light uniformly, is composed of the first LEDs, the second LEDs and the third LEDs. A 4×4 matrix is defined as a lowest matrix unit. The ratio of the numbers of the first LEDs, the second LEDs and the third LEDs is 2:1:1. Each of the lights emitted by the first LEDs, the second LEDs and the third LEDs is one of the three primary colors. In a preferred embodiment of the present invention, the first LEDs may be but are not limited to green LEDs.

In the aforementioned lowest matrix unit, there are two of the first LEDs located in each column and each row respectively, and the two of the first LEDs are not adjacent to each other. The first LED is represented by α. Please refer to FIG. 2 to 3, which illustrate diagrams of the matrixes having the first LEDs of the preferred embodiments of the present invention. As displayed in FIG. 2, the first LEDs a are located at [1, 1], [1, 3], [2, 2], [2, 4], [3, 1], [3, 3], [4, 2] and [4, 4]. That is, there are two of the first LEDs α a located within each column and each row, and the first LEDs α in the lowest matrix unit are not adjacent to one another.

Alternately, the first LEDs α a may be arranged as shown in FIG. 3 if required. As illustrated in FIG. 3, the first LEDs a are located at [1, 2], [1, 4], [2, 1], [2, 3], [3, 2], [3, 4], [4, 1] and [4, 3].

The details of the preferred embodiment of the present invention are described below respectively. There are four different preferred arrangement matrixes of the present invention, wherein the four different preferred arrangement matrixes should not limit any possibility of the present invention. Please note that the first LED, the second LED and the third LED are represented by α, β and γ, respectively.

In one preferred embodiment of the present invention, the second LEDs and the third LEDs are arranged as the arrangement matrix shown in FIG. 2. Please refer to FIG. 4, an arrangement matrix of primary color RGB LEDs according to a preferred embodiment of the present invention is illustrated. Please also refer to FIG. 2 and FIG. 4, the second LEDs β are located at [1, 2], [2, 3], [3, 4] and [4, 1]. That is, there is one of the second LED β located within each column and each row. The second LEDs β are filled in the first void space from the left of the first column and the fourth column (i.e., at [1, 2] and [4, 1]), and filled in the second void space from the left of the second column and the third column (i.e., at [2, 3] and [3, 4]).

Please also refer to FIG. 2 and FIG. 4 again, the third LEDs γ are located at [1, 4], [2, 1], [3, 2] and [4, 3]. That is, there is one of the third LED γ located within each column and each row. The third LEDs γ are filled in the second void space from the left of the first column and the second void space from the left of the fourth column (i.e., at [1, 4] and [4, 3]) in FIG. 2, and filled in the first void space from the left of the second column and the third column (i.e., at [2, 1] and [3, 2]) in FIG. 2.

According to another preferred embodiment of the present invention, the locations of the second LEDs β and the locations of the third LEDs γ are interchanged while the locations of the first LEDs α remain the same. Please refer to FIG. 2 and FIG. 5, the second LEDs β are located at [1, 4], [2, 1], [3, 2] and [4, 3]. That is, the second LEDs β are filled in the second void space is from the left of the first column and the fourth column (i.e., at [1, 4] and [4, 3]) in FIG. 2, and filled in the first void space from the left of the second column and the third column (i.e., at [2, 1] and [3, 2]) in FIG. 2. Meanwhile, the third LEDs γ are located at [1, 2], [2, 3], [3, 4] and [4, 1], as illustrated in FIG. 2 and FIG. 5. That is, the third LEDs γ are filled in the first void space from the left of the first column and the fourth column (i.e., at [1, 2] and [4, 1]) in FIG. 2, and filled in the second void space from the left of the second column and the third column (i.e., at [2, 3] and [3, 4]) in FIG. 2.

According to still another preferred embodiment of the present invention, the second LEDs and the third LEDs are arranged in the arrangement matrix as shown in FIG. 3. Please refer to FIG. 6, a diagram of an arrangement matrix of RGB primary colors LEDs according to the still another preferred embodiment of the present invention is illustrated. Please refer to FIG. 3 and FIG. 6, the second LEDs β are located at [1, 1], [2, 4], [3, 3] and [4, 2]. That is, there is a second LED β located within each column and each row. The second LEDs β are filled in the first space from the left of the first column and the fourth column (i.e., at [1, 1] and [4, 2]) in FIG. 3, and filled in the second space from the left of the second column and the third column (i.e., at [2, 4] and [3, 3]) in FIG. 3.

Please refer to FIG. 3 and FIG. 6, the third LEDs γ are located at [1, 3], [2, 2], [3, 1] and [4, 4]. That is, there is a third LED γ located within each column and each row. The third LEDs γ are filled in the second space from the left of the first column and the fourth column (i.e., at [1, 3] and [4, 4]) in FIG. 3, and filled in the first space from the left of the second column and the third column (i.e., at [2, 2] and [3, 1]) in FIG. 3.

In a further preferred embodiment of the present invention, the locations of the second LEDs β and the locations of the third LEDs γ are further interchanged while the locations of the first LEDs a remain the same. As illustrated in FIG. 7, the second LEDs β are located at [1, 3], [2, 2], [3, 1] and [4, 4], while the third LEDs γ are located at [1, 1], [2, 4], [3, 3] and [4, 2].

Therefore, the arrangement matrix of the primary colors of the present invention may be utilized to generate white light uniformly with a distance from the backlight source to the optical diaphragm between 15 mm and 25 mm, such that the problem of the chromatic polarization at peripheral areas may be reduced. Further, the present invention may be applied for generate the uniform white light in full.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An arrangement matrix of primary color light emitting diodes (LEDs), applied in a backlight source of a liquid crystal display (LCD), the arrangement matrix comprising:
    at least one first LED;
    at least one second LED; and
    at least one third LED;
wherein the at least one first LED, the at least one second LED and the at least one third LED are arranged to form a 4×4 lowest matrix unit; the ratio of the numbers of the first LED, the second LED and the third LED is 2:1:1; there are two of the first LEDs, not adjacent to each other, located in each row and in each column respectively of each 4×4 lowest matrix unit; and there are one of the second LED and one of the third LED located in each row and in each column respectively of each 4×4 lowest matrix unit.

2. The arrangement matrix of claim 1, wherein the first LED, the second LED and the third LED are respectively selected from groups consisting of red LEDs, blue LEDs and green LEDs.

3. The arrangement matrix of claim 1, wherein the first LED, the second LED and the third LED are respectively represented by α, β and γ, the lowest matrix unit is arranged as below:

$$\begin{bmatrix} \alpha & \beta & \alpha & \gamma \\ \gamma & \alpha & \beta & \alpha \\ \alpha & \gamma & \alpha & \beta \\ \beta & \alpha & \gamma & \alpha \end{bmatrix}.$$

4. The arrangement matrix of claim 1, wherein the first LED, the second LED and the third LED are respectively represented by α, β and γ, the lowest matrix unit is arranged as below:

$$\begin{bmatrix} \alpha & \gamma & \alpha & \beta \\ \beta & \alpha & \gamma & \alpha \\ \alpha & \beta & \alpha & \gamma \\ \gamma & \alpha & \beta & \alpha \end{bmatrix}.$$

5. The arrangement matrix of claim 1, wherein the first LED, the second LED and the third LED are respectively represented by α, β and γ, the lowest matrix unit is arranged as below:

$$\begin{bmatrix} \beta & \alpha & \gamma & \alpha \\ \alpha & \gamma & \alpha & \beta \\ \gamma & \alpha & \beta & \alpha \\ \alpha & \beta & \alpha & \gamma \end{bmatrix}.$$

6. The arrangement matrix of claim 1, wherein the first LED, the second LED and the third LED respectively represented by α, β and γ, the lowest matrix unit is arranged as below:

$$\begin{bmatrix} \gamma & \alpha & \beta & \alpha \\ \alpha & \beta & \alpha & \gamma \\ \beta & \alpha & \gamma & \alpha \\ \alpha & \gamma & \alpha & \beta \end{bmatrix}.$$

* * * * *

UNITED STATES PATENT AND TRADEMARK OFFICE
CERTIFICATE OF CORRECTION

PATENT NO. : 7,616,184 B2  Page 1 of 1
APPLICATION NO. : 11/525846
DATED : November 10, 2009
INVENTOR(S) : Wen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Nineteenth Day of October, 2010

David J. Kappos
*Director of the United States Patent and Trademark Office*